(12) United States Patent
Poola et al.

(10) Patent No.: US 7,680,858 B2
(45) Date of Patent: Mar. 16, 2010

(54) TECHNIQUES FOR CLUSTERING STRUCTURALLY SIMILAR WEB PAGES

(75) Inventors: Krishna Leela Poola, Bangalore (IN); Arun Ramanujapuram, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 440 days.

(21) Appl. No.: 11/481,734

(22) Filed: Jul. 5, 2006

(65) Prior Publication Data
US 2008/0010291 A1    Jan. 10, 2008

(51) Int. Cl.
*G06F 17/30* (2006.01)
(52) U.S. Cl. .................... 707/736; 707/737
(58) Field of Classification Search .......... 707/104.1, 707/6, 200, 102, 2, 3–5, 7, 709, 710, 711, 707/736, 737, 758; 709/247
See application file for complete search history.

(56) References Cited

U.S. PATENT DOCUMENTS

| | | | | |
|---|---|---|---|---|
| 5,999,929 | A * | 12/1999 | Goodman | 707/7 |
| 6,178,461 | B1 * | 1/2001 | Chan et al. | 709/247 |
| 6,182,085 | B1 * | 1/2001 | Eichstaedt et al. | 707/104.1 |
| 6,523,026 | B1 | 2/2003 | Gillis | |
| 6,629,097 | B1 | 9/2003 | Keith | |
| 6,654,741 | B1 * | 11/2003 | Cohen et al. | 707/6 |
| 6,895,552 | B1 | 5/2005 | Balabanovic et al. | |
| 7,363,311 | B2 | 4/2008 | Fujita et al. | |
| 7,440,968 | B1 * | 10/2008 | Oztekin et al. | 707/102 |
| 2002/0159642 | A1 | 10/2002 | Whitney | |
| 2003/0140033 | A1 | 7/2003 | Lizuka et al. | |
| 2003/0187837 | A1 * | 10/2003 | Culliss | 707/3 |
| 2004/0122686 | A1 * | 6/2004 | Hill et al. | 705/1 |
| 2004/0177015 | A1 * | 9/2004 | Galai et al. | 705/35 |
| 2005/0004910 | A1 | 1/2005 | Trepess | |
| 2005/0010599 | A1 | 1/2005 | Kake et al. | |
| 2005/0055365 | A1 * | 3/2005 | Ramakrishnan et al. | 707/102 |
| 2005/0267915 | A1 * | 12/2005 | Zhulong et al. | 707/200 |
| 2006/0195297 | A1 * | 8/2006 | Kubota et al. | 702/187 |
| 2006/0218143 | A1 * | 9/2006 | Najork | 707/6 |
| 2007/0050338 | A1 * | 3/2007 | Strohm et al. | 707/3 |
| 2007/0094615 | A1 | 4/2007 | Endo et al. | |
| 2007/0130318 | A1 | 6/2007 | Roast | |
| 2008/0072140 | A1 | 3/2008 | Vydiswaran et al. | |
| 2008/0162541 | A1 | 7/2008 | Oresic et al. | |
| 2008/0281816 | A1 * | 11/2008 | Kim | 707/6 |
| 2009/0070872 | A1 * | 3/2009 | Cowings et al. | 726/23 |

OTHER PUBLICATIONS

U.S. Appl. No. 11/847,989, filed Aug. 30, 2007, Notice of Publication, Mailing Date, Mar. 5, 2009.

* cited by examiner

*Primary Examiner*—Hung T Vy
(74) *Attorney, Agent, or Firm*—Hickman Palermo Truong & Becker LLP (57) ABSTRACT

Web page clustering techniques described herein are URL Clustering and Page Clustering, whereby clustering algorithms cluster together pages that are structurally similar. Regarding URL clustering, because similarly structured pages have similar patterns in their URLs, grouping similar URL patterns will group structurally similar pages. Embodiments of URL clustering may involve: (a) URL normalization and (b) URL variation computation. Regarding page clustering, page feature-based techniques further cluster any given set of homogenous clusters, reducing the number of clusters based on the underlying page code. Embodiments of page clustering may reduce the number of clusters based on the tag probabilities and the tag sequence, utilizing an Approximate Nearest Neighborhood (ANN) graph along with evaluation of intra-cluster and inter-cluster compactness.

40 Claims, 7 Drawing Sheets

```
┌─────────────────────────────────────────────────────────┐
│   FOR A SAMPLE OF PAGES FROM EACH OF A PLURALITY OF     │
│   GROUPS OF WEB PAGES THAT ARE GROUPED BASED ON THEIR   │
│   SIMILARITY, COMPUTE A RESPECTIVE DISTANCE OF SIMILARITY│
│   BETWEEN FEATURES WITHIN EACH SAMPLE PAGE AND THE      │
│        FEATURES WITHIN THE OTHER SAMPLE PAGES           │
│                          602                            │
└─────────────────────────────────────────────────────────┘
                             │
                             ▼
┌─────────────────────────────────────────────────────────┐
│   FOR THE SAMPLE OF PAGES FROM EACH OF THE PLURALITY OF │
│   GROUPS, COMPUTE A RADIUS OF INFLUENCE FOR EACH SAMPLE │
│   PAGE BASED ON THE DISTANCE OF SIMILARITY BETWEEN THE  │
│   FEATURES WITHIN THE SAMPLE PAGE AND THE FEATURES      │
│         WITHIN A NEAREST NEIGHBORING SAMPLE PAGE        │
│                          604                            │
└─────────────────────────────────────────────────────────┘
                             │
                             ▼
┌─────────────────────────────────────────────────────────┐
│     DETERMINE FOR EACH SAMPLE PAGE, INFLUENTIAL SAMPLE  │
│   PAGES, FROM THE OTHER SAMPLE PAGES FROM THE PLURALITY │
│   OF GROUPS, WHOSE DISTANCE OF SIMILARITY FROM THE      │
│   SAMPLE PAGE IS LESS THAN THE RADIUS OF INFLUENCE FOR  │
│                      THE SAMPLE PAGE                    │
│                          606                            │
└─────────────────────────────────────────────────────────┘
                             │
                             ▼
┌─────────────────────────────────────────────────────────┐
│     IDENTIFY, FROM THE PLURALITY OF GROUPS, ONE OR MORE │
│   CANDIDATE GROUP PAIRS WHOSE CONSTITUENT GROUPS ARE A  │
│   CANDIDATE FOR MERGING, BASED ON SUMMED DISTANCES OF   │
│      SIMILARITY AMONG THE SAMPLE PAGES FROM THE         │
│                    CONSTITUENT GROUPS                   │
│                          608                            │
└─────────────────────────────────────────────────────────┘
                             │
                             ▼
┌─────────────────────────────────────────────────────────┐
│   COMPUTE THE INTRA-GROUP COMPACTNESS AND INTER-GROUP   │
│   COMPACTNESS FOR GROUPS FROM A FIRST CANDIDATE GROUP   │
│                          PAIR                           │
│                          610                            │
└─────────────────────────────────────────────────────────┘
                             │
                             ▼
┌─────────────────────────────────────────────────────────┐
│  DETERMINE WHETHER TO MERGE THE GROUPS FROM THE FIRST   │
│    CANDIDATE GROUP PAIR BASED ON THE INTRA-GROUP        │
│    COMPACTNESS AND/OR THE INTER-GROUP COMPACTNESS       │
│                          612                            │
└─────────────────────────────────────────────────────────┘
```

TECHNIQUES FOR CLUSTERING STRUCTURALLY SIMILAR WEB PAGES

CROSS REFERENCE TO RELATED APPLICATIONS

This application is related to U.S. patent application Ser. No. 11/481,809 filed on Jul. 5, 2006, entitled "TECHNIQUES FOR CLUSTERING STRUCTURALLY SIMILAR WEB PAGES BASED ON PAGE FEATURES", the entire content of which is incorporated by reference for all purposes as if fully disclosed herein.

FIELD OF THE INVENTION

The present invention relates to computer networks and, more particularly, to techniques for clustering structurally similar web pages.

BACKGROUND OF THE INVENTION

World Wide Web-General

The Internet is a worldwide system of computer networks and is a public, self-sustaining facility that is accessible to tens of millions of people worldwide. The most widely used part of the Internet is the World Wide web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

In this context, an HTML file is a file that contains the source code for a particular web page. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

Search Engines

Through the use of the web, individuals have access to millions of pages of information. However a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Second, each search engine contains information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, an interface for displaying the search results. Typically, the search engine orders the search results prior to presenting the search results interface to the user. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search results page" that presents information about the matching documents in the selected display order.

Information Extraction Systems

The web presents a wide variety of information, such as information about products, jobs, travel details, etc. Most of the information on the web is structured (i.e., pages are generated using a common template or layout) or semi-structured (i.e., pages are generated using a template with variations, such as missing attributes, attributes with multiple values, exceptions, etc.). For example, an online bookstore typically lays out the author, title, comments, etc. in the same way in all its book pages. Information Extraction (IE) systems are used to gather and manipulate the unstructured and semi-structured information on the web and populate backend databases with structured records. Most IE systems are either rule based (i.e., heuristic based) extraction systems or automated extraction systems. In a website with a reasonable number of pages, information (e.g., products, jobs, etc.) is typically stored in a backend database and is accessed by a set of scripts for presentation of the information to the user.

IE systems commonly use extraction templates to facilitate the extraction of desired information from a group of web pages. Generally, an extraction template is based on the general layout of the group of pages for which the corresponding extraction template is defined. One technique used for generating extraction templates is referred to as "wrapper induction", which automatically constructs wrappers (i.e., customized procedures for information extraction) from labeled examples of a page's content. The wrapper induction technique is considered a computationally expensive technique.

Hence, managing the amount of information and pages input to a wrapper induction process can thereby manage the overall computational cost of use for IE systems.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described for clustering similarly structured web pages, such as web pages coded in HTML. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview of Embodiments

As mentioned, web-based information is typically stored in a backend database and is accessed by a set of scripts for presentation of the information to users. Because each script generates a similar set of pages, that differ only in the information embedded in the different place holders, grouping of these similar pages helps extraction based systems to learn rules efficiently. Clustering aims at grouping these similarly structured pages to increase both performance and accuracy of extraction, e.g., by eliminating less valuable pages and information from the extraction process and increasing the accuracy of any extraction templates that may be used to extract information from a website or domain.

Page clustering techniques described herein are: (1) URL Clustering, referred to herein as "CURL" (Clustering URLs); and (2) Page Clustering, referred to herein as "CLiP" (CLustering Pages). A goal for both techniques is to not generate false positives. That is, clustering algorithms should not cluster together pages that are not structurally similar. Each of the techniques may be implemented and used separately of the other technique, or the techniques may be implemented and used in conjunction with each other. For example, a two-phase clustering approach described herein involves both techniques, where a cluster hierarchy output from CURL serves as input to CLiP.

Regarding URL clustering, because similarly structured pages (i.e., pages generated by the same script) have similar patterns in their URLs, grouping similar URL patterns likely groups similar pages. CURL groups URLs that share similar patterns, where such grouping increases the performance of IE systems because only URLs of a domain are considered and not the complete pages of the domain. Because CURL clusters pages based on patterns in the URLs, CURL is considered a 'lightweight' or computationally inexpensive clustering engine. According to one embodiment, the CURL clustering strategy involves the following two processes: (a) URL normalization; and (b) URL variation computation.

Regarding page clustering, if there are many different URL patterns in a given domain, then CURL will produce a relatively large number of clusters. To avoid such a scenario, page clustering may be performed based on page features. CLiP involves a clustering technique that further clusters any given set of homogenous clusters. Thus, when used in conjunction with CURL, CLiP reduces the number of clusters generated by CURL in order to increase the efficiency of IE systems. CLiP reduces the number of clusters based on the underlying page code. According to one embodiment, CLiP techniques reduce the number of clusters based on the tag probabilities (i.e., frequency of tags in a domain) and the tag sequence. According to one embodiment, CLiP techniques utilize an Approximate Nearest Neighborhood (ANN) graph, along with evaluation of intra-cluster and inter-cluster compactness.

System Architecture Example

Figure 1:
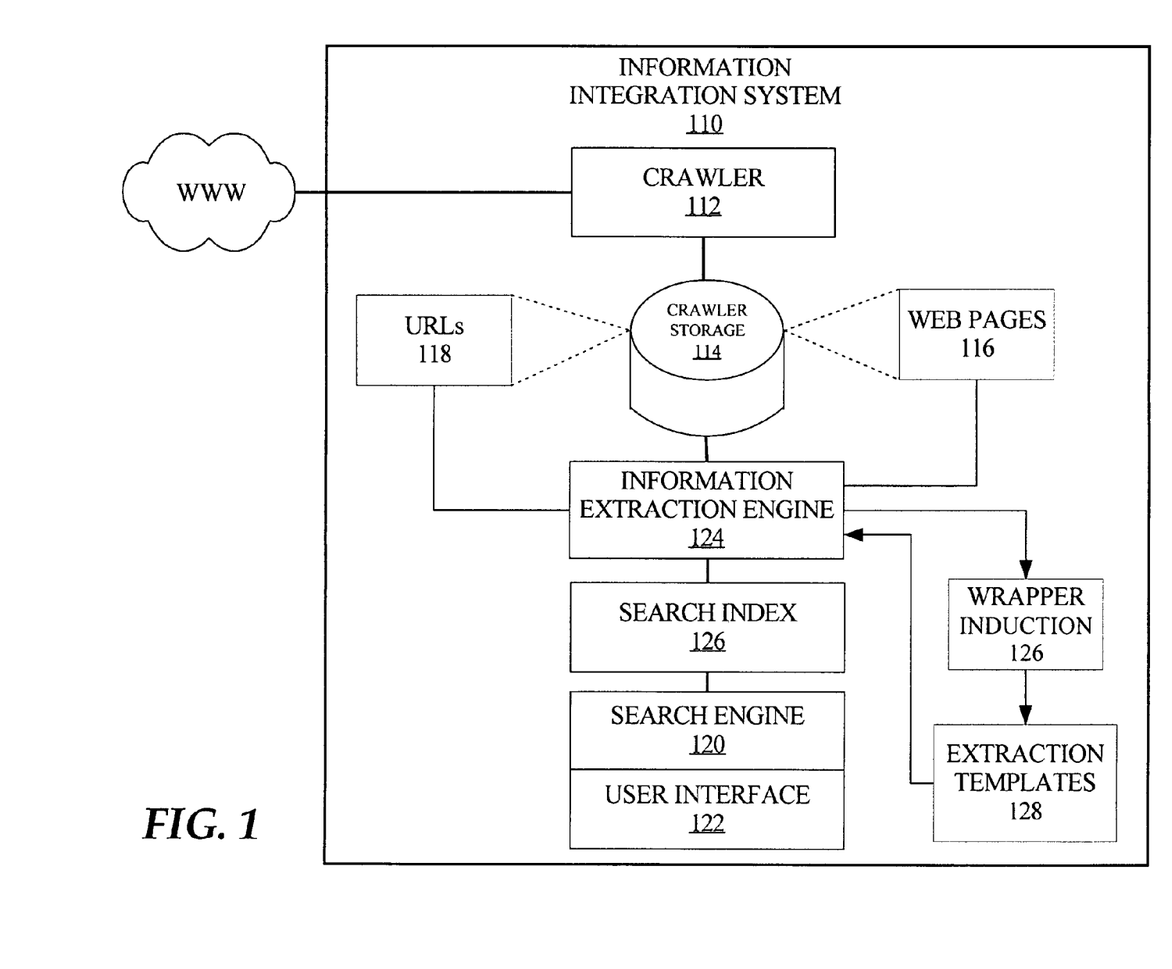
FIG. 1 is a block diagram that illustrates an Information Integration System (IIS), in which an embodiment of the invention may be implemented.

FIG. 1 is a block diagram that illustrates an Information Integration System (IIS), in which an embodiment of the invention may be implemented. The context in which an IIS can be implemented may vary. For non-limiting examples, an IIS such as IIS 110 may be implemented for public or private search engines, job portals, shopping search sites, travel search sites, RSS (Really Simple Syndication) based applications and sites, and the like. Embodiments of the invention are described herein primarily in the context of a World Wide Web (WWW) search system, for purposes of an example. However, the context in which embodiments are implemented is not limited to Web search systems. For example, embodiments may be implemented in the context of private enterprise networks (e.g., intranets), as well as the public network of networks (i.e., the Internet).

IIS 110 can be implemented comprising a crawler 112 communicatively coupled to a source of information, such as the Internet and the World Wide Web (WWW). IIS 110 further comprises crawler storage 114, a search engine 120 backed by a search index 126 and associated with a user interface 122.

A web crawler (also referred to as "crawler", "spider", "robot"), such as crawler 112, "crawls" across the Internet in a methodical and automated manner to locate web pages around the world. Upon locating a page, the crawler stores the page's URL in URLs 118, and follows any hyperlinks associated with the page to locate other web pages. The crawler also typically stores entire web pages 116 (e.g., HTML and/or XML code) and URLs 118 in crawler storage 114. Use of this information, according to embodiments of the invention, is described in greater detail herein.

Search engine 120 generally refers to a mechanism used to index and search a large number of web pages, and is used in conjunction with a user interface 122 that can be used to search the search index 126 by entering certain words or phases to be queried. In general, the index information stored in search index 126 is generated based on extracted contents of the HTML file associated with a respective page, for example, as extracted using extraction templates 128 generated by wrapper induction 126 techniques. Generation of the index information is one general focus of the IIS 110, and such information is generated with the assistance of an information extraction engine 124. For example, if the crawler is storing all the pages that have job descriptions, an extraction engine 124 may extract useful information from these pages, such as the job title, location of job, experience required, etc. and use this information to index the page in the search index 126. One or more search indexes 126 associated with search engine 120 comprise a list of information accompanied with the location of the information, i.e., the network address of, and/or a link to, the page that contains the information.

As mentioned, extraction templates 128 are used to facilitate the extraction of desired information from a group of web pages, such as by information extraction engine 124 of IIS 110. Further, extraction templates may be based on the general layout of the group of pages for which a corresponding extraction template is defined. For example, an extraction template 128 may be implemented as an XML file that describes different portions of a group of pages, such as a product image is to the left of the page, the price of the product is in bold text, the product ID is underneath the product image, etc. Wrapper induction 126 processes may be used to generate extraction templates 128. Interactions between embodiments of the invention and wrapper induction 126 and extraction templates 128 are described in greater detail herein.

The following are some non-limiting examples of benefits to using page clustering based on structural similarity as one of the initial modules in an IE system.

(a) Performance improvement as a result of processing only clusters of interest. For example, only product clusters are processed for a shopping vertical site, rather than browse and non-product clusters.

(b) Clusters of structurally homogenous pages assist the "learning" of wrappers or extraction templates in a scalable, efficient, repeatable manner. Thus, an efficient wrapper can be generated based on a cluster of homogenous pages.

(c) Performance improvement as a result of processing a sample from each cluster, such as by classifying a sample of pages and generalizing the label of the sample to the whole cluster.

(d) Identification of site topology/structure using the hyperlinks between clusters, such as determining that browse clusters usually link to product clusters in shopping domain.

(e) Noise section removal by identifying static content or template sections of the website as sections composed of hyperlinks.

Clustering Pages Based on Corresponding Uniform Resource Locators (CURL)

According to one embodiment, URL Clustering, referred to herein as "CURL" (Clustering URLs), involves (a) URL normalization and (b) URL variation computation, each of which is described in greater detail herein. A non-limiting use of CURL is in the context of a 'vertical' website, which is generally a website that provides a gateway or portal to information related to a particular concept or industry, such as shopping, travel, jobs, health care, insurance, automobiles, etc. CURL is based on the hypothesis or premise that similar URLs typically have similar structures, i.e., similar URLs point to similar types of pages within a given vertical web site (e.g., product pages, or listings/browse pages, or non-product pages, etc., for a shopping vertical) and/or point to similar types of information within pages (e.g., product information in a product page). If a script is used to generate web pages, all pages generated by the script typically have a similar structure or layout, with conditionals in the script changing the actual content within portions of such pages. Therefore, the CURL techniques attempt to group pages generated by the same script and therefore which are structurally similar, based only on the URLs associated with such pages.

Figure 2:
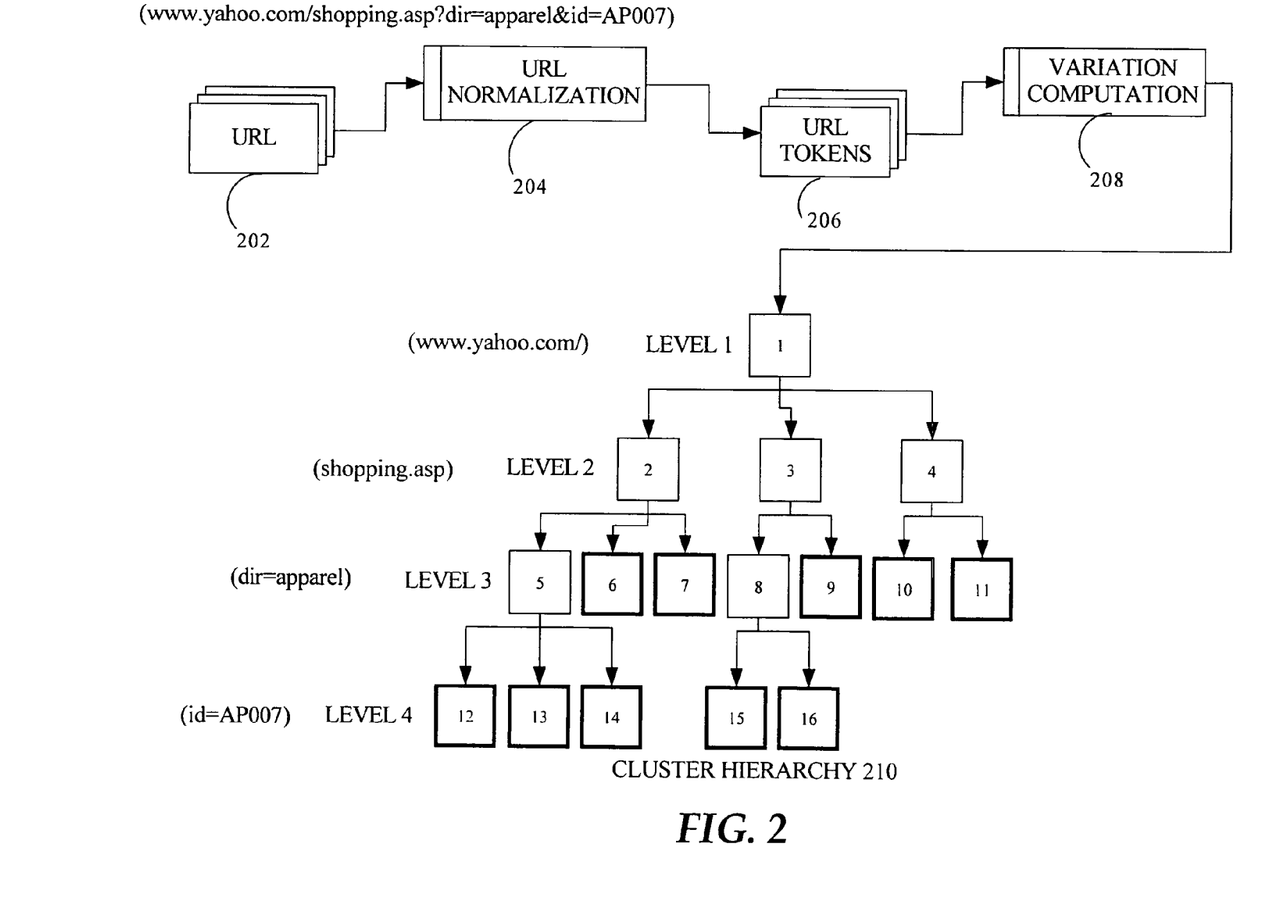
FIG. 2 is a block diagram illustrating operational functionality of the CURL techniques, according to an embodiment of the invention.

FIG. 2 is a block diagram illustrating operational functionality of the CURL techniques, according to an embodiment of the invention. FIG. 2 illustrates that each URL 202 from a group of URLs (e.g., URLs 118 of FIG. 1) associated with a domain, such as a particular website domain, is used as input to a process referred to as URL normalization 204. A set of URL tokens 206 is output from URL normalization 204 and used as input to a process referred to as variation computation 208, from which a multi-level cluster hierarchy 210 is output. Cluster hierarchy 210 is depicted having four levels (Level 1-Level 4) for purposes of example only and, therefore, cluster hierarchies output by CURL are not limited to four levels.

(A) URL Normalization

Each URL 202 input into URL normalization 204 may be retrieved from crawler storage 114 (FIG. 1). URL normalization 204 tokenizes URLs 202 into multiple tokens based on pattern changes. URL normalization 204 is based on "level" information derived from the URLs. URL normalization 204 and variation computation 208 are considered scalable processes because these processes do not require parsing web pages in order to cluster structurally similar pages within a domain.

URL Levels and Level Delimiters

It is desirable to build the cluster hierarchy 210 by clustering pages at levels that demonstrate the least, or less, variation relative to other levels. As depicted in FIG. 2, variation computation 208 generates a multi-level cluster hierarchy 210. In cluster hierarchy 210, each of blocks 1-16 represents a cluster of pages determined by the CURL process, where leaf node clusters are depicted as bold blocks. According to embodiments, levels of a URL are determined using one or more of the following "token delimiters": (a) static token delimiters (e.g., standard, unlearned URL delimiters); (b) learned token delimiters (delimiters learned from the set of URLs under consideration); and/or (c) unit change denominations. Some levels are separated by static delimiters, such as the following symbols: '/', '?', or '&'. Sublevels of each level are also considered, where sublevels may be determined by learned token delimiters. That is, sublevels at any particular level may be separated by learned token delimiters which are usually "special characters," such as the following non-limiting examples: '=' (e.g., key-value pairs), '_', '-', '~', '#', '$', etc. The term "special characters" refers to all the visible characters which are neither alphabets nor numeric, not including the delimiters which are chosen for static delimiters. For example, with a group of web pages having URLs with "product_review" or "product_information", the "_" may be considered to delimit two different structures for content and, therefore, two different levels for clustering the group of pages. By definition, the term 'learned token delimiters' indicates that the set of possible learned token delimiters is not restricted or limited, in contrast to static delimiters. Unit change denominations, as described hereafter, also provide a basis for normalization.

Unit change denominations represent a change from one unit to another, where units are letters, numbers, or symbols other than the foregoing symbols used as static and learned token delimiters, and where multiple URLs are characterized with the same pattern. For example, "123ABC" contains a unit change from a series of numbers to a series of letters. Normalizing URLs based on learned token delimiters or unit changes is challenging in that every learned token delimiter or unit change may not represent a possible level/sublevel, as some of the unit changes are not very prominent (i.e., the unit change is present in only a small subset of all the URLs under consideration). Furthermore, as learned token delimiters include all kinds of special characters, normalizing on learned token delimiters is a complex process. According to one embodiment, a "support-based" normalization routine is used to verify if a unit change could or should be considered as a URL level.

Support-based normalization involves computing the "support" for each learned token delimiter or unit change and checking if the support exceeds a corresponding "support threshold". Learned token delimiters and unit changes with support exceeding a corresponding support threshold are determined to delimit new levels because support indicates the relative prominence of the delimiter or unit change in the group of URLs currently under consideration in the CURL process, such as the URLs associated with a particular website domain. According to one embodiment, support for unit change $u_1$ (or learned token delimiter) is defined as:

Support $(u_1)$=(Number of URLs in which $u_1$ is present)/(Total number of URLs under consideration).

For the following example URL: "www.yahoo.com/shopping.asp?dir=apparel&id=AP007", the levels are (1) "www.yahoo.com", (2) "shopping.asp", (3) "dir=apparel", and (4) "id=AP007". Sublevels for the level "dir=apparel" are (i) "dir", and (ii) "apparel" based on a learned token delimiter key-value pair. Sublevels for the level "id=AP007" are (i) "id", (ii) "AP", and (iii) "007" based on a learned token delimiter key-value pair (id=AP007) and a unit change (from letters "AP" to numbers "007") that is considered prominent enough to serve as a delimiter based on the unit change's support computation.

URL Tokenization

Once appropriate delimiters are determined for a group of URLs, and the one or more levels of each URL 202 in the group are determined, URL normalization 204 normalizes the URLs by tokenizing the URLs. Tokenizing the URLs involves assigning a unique token value to each level of the URLs, resulting in a set of tokens that represents each corresponding URL. Each token value in a set uniquely identifies the portion of the URL at the corresponding level of the URL. With the foregoing example URL "www.yahoo.com/shopping.asp?dir=apparel&id=AP007", a unique token is used to characterize each of the levels "www.yahoo.com", "shopping.asp", "dir=apparel", and "id=AP007". FIG. 2 shows how the different levels of this example URL map to levels 1-4 of the cluster hierarchy 210, where the example URL would be a member of one of the clusters 1-16 at each corresponding level. Similarly, each of the sublevels "dir", "apparel", "id", "AP", and "007" can be characterized by a token if such sublevels are computed to have enough support to be considered a separate level. Note that each demarcation of a cluster is based on tokens at a particular level, however, it is the URLs that are members of clusters.

According to one embodiment, normalized information is used, after clustering of pages, to label the clusters based on identifiers, keywords, etc., generated by URL normalization 204.

(B) Variation Computation

After normalizing the URLs (e.g., URL normalization 204), variation computation 208 clusters pages at some levels of the cluster hierarchy 210 based on the respective variation at the levels. That is, variation computation 208 considers clustering the level of the cluster hierarchy 210 that has the minimum "variation", defined as follows. According to one embodiment, variation at level L is based on keywords within the URLs at level L, and is defined as:

Variation (L)=(Number of distinct URL keywords at L)/(Total number of URLs under consideration).

According to one embodiment, variation at level L is based on 'Entropy', which is defined as:

$$\text{Entropy } (L) = -\sum_{i=1}^{n} p(i)\log_n p(i),$$

where p(i) is the probability of the $i^{th}$ URL keyword being at level L.

As the count of distinct keywords at a given level is used to represent the variation at that level, variation computation 208 of CURL gives clustering preference to the level with the minimum variation. This is because minimum variation equates to maximum URL affinity at that level, relative to the other levels of the group of URLs. To state otherwise, the URL level having the maximum affinity is the level that has the least number of distinct terms used in the URL at that level. Hence, as a result of fewer distinct terms at that level, it is highly probable that each distinct term and the corresponding pages pointed to by the URLs at that level are generated by the same script or generation template and, therefore, are structurally similar. Demarcating clusters based on each distinct keyword is based on the assumption that each distinct keyword with high probability generates a similar set of pages.

Clustering URLs, and therefore corresponding pages, at a particular level results in a number of child clusters at the next lower level equal to the number of distinct keywords at that next lower level, with each child cluster at that next lower level containing the URLs with the corresponding distinct cluster-keyword. For example, consider the following three URLs: "www.yahoo.com/shopping/dir=apparel", "www.yahoo.com/shopping/dir=furniture", and "www.yahoo.com/travel/dest=mars". The variation at level L1 is 0.33 (⅓) as "www.yahoo.com" is common across all URLs, and the variation at level L2 is 0.66 (⅔) as "shopping" and "travel" are the only set of keywords at L2. The variation at level L3 is the variation of the keys of the key-value pairs at that level, which is 0.66 (⅔) because "dir" and "dest" are the only two distinct keywords at L3. Because level L1 has the smallest variation, level L1 is selected for forming the first cluster, with a label such as "www.yahoo.com". Thus, all three URLs are grouped together in a single level L1 cluster. Next, "www.yahoo.com/shopping/dir=apparel" and "www.yahoo.com/shopping/dir=furniture" are grouped together in a level L2 cluster and "www.yahoo.com/travel/dest=mars" is placed in a different level L2 cluster. Finally, "www.yahoo.com/shopping/dir=apparel" is placed in a level L3 cluster, and "www.yahoo.com/shopping/dir=furniture" is placed in a different level L3 cluster. Clusters at each level can be either (a) an internal cluster node, in which case the cluster points to all the child clusters and, optionally, stores all the URLs in that cluster (i.e., a union of all URLs in the child clusters); or (b) a leaf cluster, in which case the cluster does not have any child clusters to point to and therefore stores just the URLs in that cluster.

As mentioned, clustering in this manner produces the same number of child clusters at a given level as the number of distinct keywords in the set of URLs at that level. This process is continued until a state is reached in which (a) there are no levels remaining for further clustering or (b) there are no levels whose variation is greater than a "variation threshold", where the variation threshold is the minimum variation value required for any set of URLs at a level to be considered for clustering. The variation threshold also denotes the minimum number of URLs that should be present in each of the child clusters resulted by clustering a particular level. According to one embodiment, the variation threshold is a function of the number of URLs under consideration, such as the number of URLs associated with a particular domain. According to an alternative embodiment, level-based variation thresholds are dynamically determined for each cluster as a function of the number of URLs associated with a particular domain, the particular level of the cluster, and the number of URLs in the cluster.

According to one embodiment, clusters are identified that may possibly be discarded based on the number of URLs in the cluster. The cluster under consideration should pass the corresponding variation threshold for one or more child clusters to be discarded based on a "cluster threshold", which is the minimum number of URLs of which a child cluster should be comprised. Stated otherwise, if the cluster threshold is not met for a cluster at a given level, then the cluster is considered an "unimportant" cluster and the extraction of indexable keywords for the pages corresponding to this cluster is avoided.

As depicted in FIG. 2, execution of the CURL process will result in a cluster hierarchy 210. According to one embodiment, in a cluster hierarchy 210 every leaf node (depicted in bold) represents a collection of structurally similar URLs and non-leaf nodes contain references or pointers to corresponding child nodes/clusters along with pointers to all the URLs corresponding to the child nodes/clusters.

Figure 3:
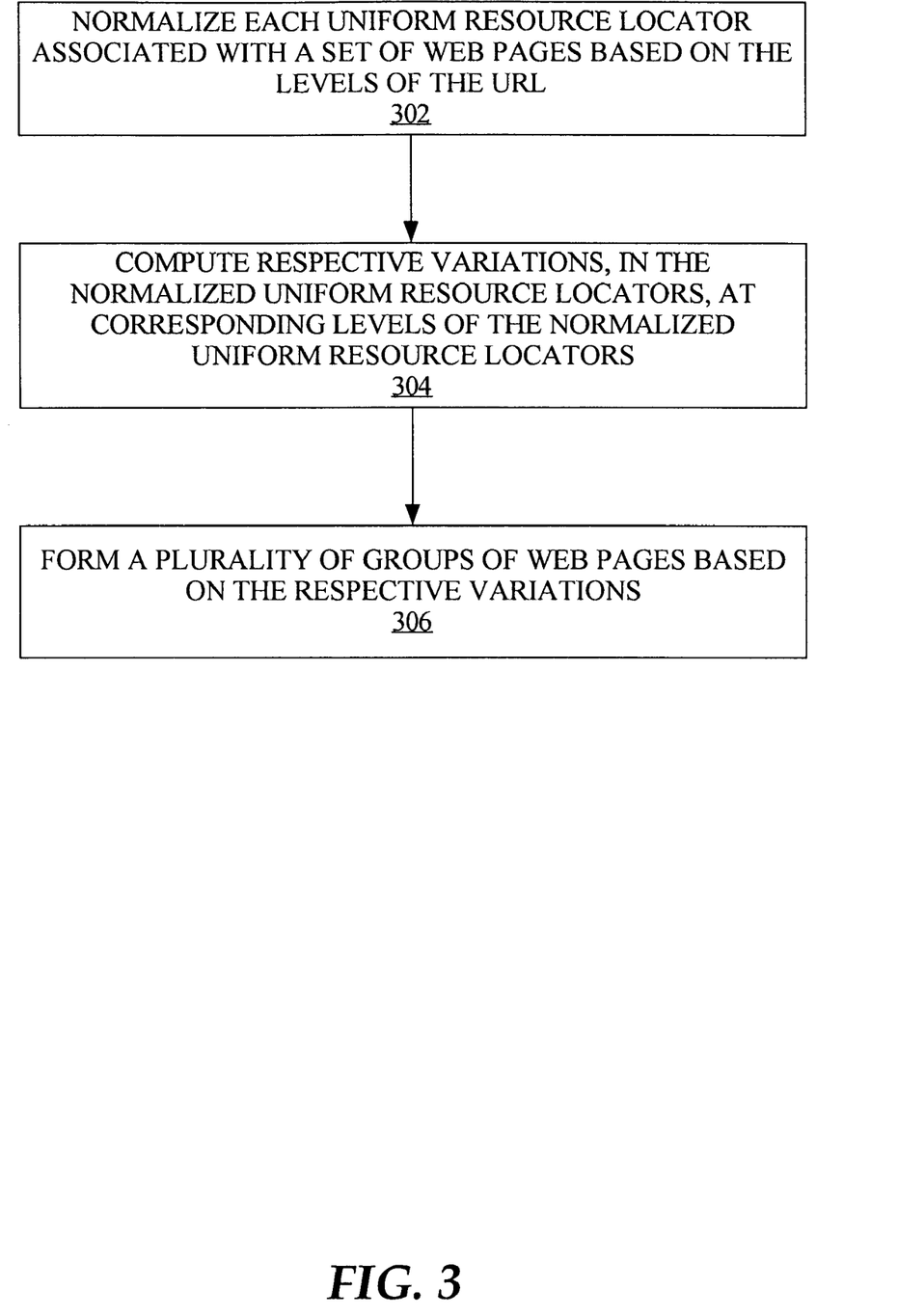
FIG. 3 is a flow diagram illustrating a first automated process for grouping structurally similar web pages based on the URLs of the web pages, according to embodiments of the invention.
Figure 4:
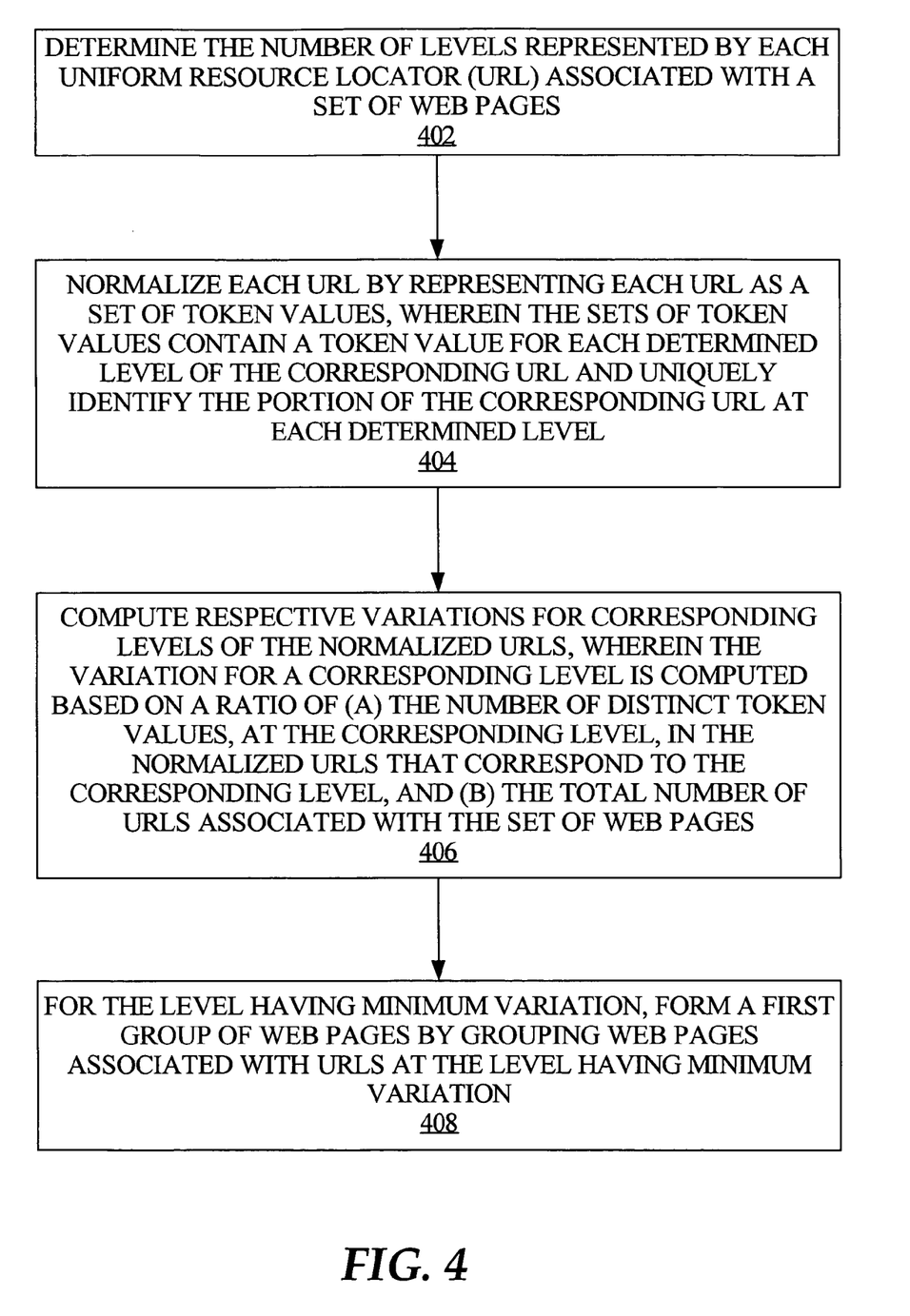
FIG. 4 is a flow diagram illustrating a second automated process for grouping structurally similar web pages based on the URLs of the web pages, according to embodiments of the invention.

Methods for Grouping Structurally Similar Pages Based on Corresponding Uniform Resource Locators FIG. 3 is a flow diagram illustrating a first automated process for grouping structurally similar web pages based on the URLs of the web pages, according to embodiments of the invention. FIG. 4 is a flow diagram illustrating a second automated process for grouping structurally similar web pages based on the URLs of the web pages, according to embodiments of the invention. In embodiments, the processes illustrated in FIGS. 3 and 4 are implemented for automated performance by a conventional computing system, such as computer system 700 of FIG. 7. Further, in embodiments, the processes illustrated in FIGS. 3 and 4 are implemented for automated performance within a software system architecture, such as that illustrated in FIG. 1. Because the processes illustrated in FIG. 3 and FIG. 4 are, to a limited extent, similar in operation, these processes are described concurrently as follows.

At block 302 of FIG. 3, each Uniform Resource Locator (URL) associated with a set of web pages is normalized based on the levels of the URL. As a result of the level-based normalization, the portion of the URLs at corresponding levels can be readily compared to determine if the portions for respective URLs are the same or different.

At block 402 of FIG. 4, the number of levels represented by each URL associated with a set of web pages is determined. According to one embodiment, URL delimiters such as (a) static delimiters, (b) learned token delimiters, and (c) unit change denominations, are determined as described herein. Using such delimiters, associated URL levels are determined for a group of URLs.

At block 404 of FIG. 4, each Uniform Resource Locator (URL) associated with a set of web pages is normalized based on the levels of the URL, where each URL is normalized by tokenizing the URL level by level, as described herein. Hence, the each set of token values for a corresponding normalized URL contains a token value for each determined level of the corresponding URL, and uniquely identifies the portion of the corresponding URL at each determined level of the URL.

At block 304 of FIG. 3, the variation in the normalized URLs, at corresponding levels of the URLs, is computed.

At block 406 of FIG. 4, respective variations are computed, where each variation corresponds to a determined level of the normalized URLs. According to one embodiment, the variation of each level of each URL is computed based on the equation: variation (at level L)=(Number of distinct URL keywords at level L)/(Total number of URLs under consideration), as described herein.

At block 306 of FIG. 3, a plurality of groups of web pages is formed based on the respective variations at levels of the URLs in each respective group.

At block 408 of FIG. 4, a first group is formed at the level having the minimum variation, by grouping web pages associated with URLs at the level having the minimum variation, as described herein. Further, additional groups may be formed at lower levels having increasing variation until a termination condition is met (e.g., no more levels or no more levels meeting a variation threshold), as described herein. As mentioned, because the count of distinct keywords at a given level is used to represent the variation at that level, lesser variation equates to more URL affinity at that level relative to the other levels of the group of URLs and therefore equates to more URL similarity at that level. Web pages at levels having more relative URL similarity are more likely to be structurally similar.

The URL clustering process described herein provides a scalable information extraction enhancement tool for extracting indexable information from web pages associated with a website or other domain. For example, non-limiting uses of these techniques is for extracting information from domain-specific web pages, such as for feeding vertical sites (e.g., verticals regarding products, travel, jobs, etc.), and for focused web crawling by providing feedback to the crawler in order to narrow the crawl domain to a subset of pages. Furthermore, the process helps eliminate 'noise' from websites and web pages in the context of extracting information from the websites, by providing focus to the extraction process, e.g., only extract from product pages of a large website rather than trying to crawl and extract from the entire site, or only extract from particular sections of structurally similar clustered pages (i.e., zoom into extraction zones of the pages).

Once structurally similar web pages are identified using the techniques described herein, such pages (e.g., pages grouped in a leaf node cluster) can be fed to a wrapper induction process for extraction template generation. The wrapper induction process can then look at sample pages from a cluster to generate an extraction template for pages in the cluster, whereby the extraction template can be used to extract interesting information from the cluster.

The CURL techniques are unique for clustering similar pages based on URLs in part because the techniques employ a global variation-based automated clustering algorithm with clustering levels selected dynamically based on the variations. Performance of CURL has been evaluated on websites from various verticals: shopping, travel, and local, where experimental evaluation of CURL shows that CURL takes approximately 30 seconds to process domains with more than one million URLs (where the variation is not more than ±5 seconds). The processing performance depends not only on the number of URLs but also on the size of URLs in the URL corpus. Traditional clustering algorithms for clustering structurally similar pages assume user-given parameters such as thresholds. Parameters in CURL may, in some embodiments, be modeled as a function of the features of the domain (e.g., the number of URLs of the domain under consideration, number of levels of the cluster hierarchy, the number of siblings of a cluster in the cluster tree, and the like).

Clustering Pages Based on Page Features

According to one embodiment, web page clustering, referred to herein as "CLiP" (CLustering Pages), involves clustering any given set of homogenous clusters of pages which were previously segregated and grouped based on another clustering technique. CLiP aggregates pages at the cluster level by determining similarity between clusters of pages, based generally on one or more set of features of the pages. Generally, parameters in CLiP may be modeled as a function of page features like tag probability and tag sequence, support of cluster pairs, and intra and inter cluster compactness.

According to one non-limiting embodiment, the cluster hierarchy output from the CURL techniques is used as input to the CLiP techniques. If there are many URL patterns, CURL will produce a large number of clusters. To avoid such a scenario, page clustering with CLiP techniques is based on page features. Thus, in the embodiment in which CURL and CLiP are used in conjunction with each other, CLiP aims at reducing the number of clusters generated by CURL in order to increase the efficiency of information extraction. CLiP differs from CURL by considering the features of the web page (e.g., html, xml, etc.) rather than the features of the URL. According to one embodiment, the page features considered for clustering by CLiP are the tag probabilities and tag sequence, which are descried in greater detail herein.

Figure 5:
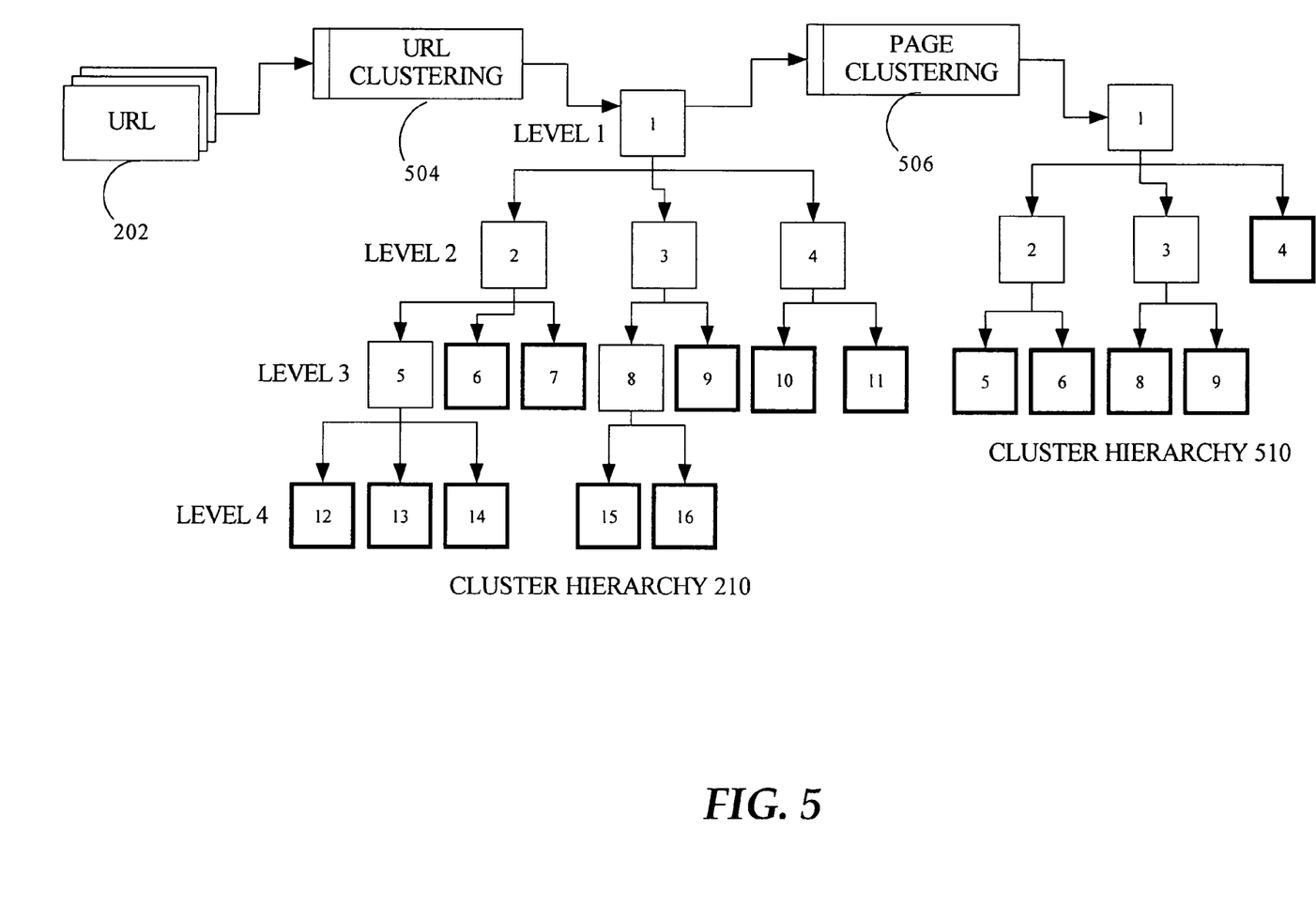
FIG. 5 is a block diagram illustrating a 2-phase approach to clustering structurally similar web pages: URL clustering followed by page feature clustering.

2-Phase Approach to Clustering Similar Pages Based on URL Clustering and Page Feature Clustering FIG. 5 is a block diagram illustrating a 2-phase approach to clustering structurally similar web pages: URL clustering (e.g., CURL), followed by page clustering (e.g., CLiP). The example clusters illustrated in FIG. 5 depict cluster hierarchy 210, the output of a URL clustering 504 technique, fed as input into a page clustering 506 technique. As mentioned, URL clustering 504 may be implemented according to the CURL techniques described herein, and page clustering 506 may be implemented according to the CLiP techniques described herein. However, implementations are not so limited because each of the CURL and CLiP techniques may be implemented separately or implemented in combination with each other.

FIG. 5 depicts that a group of 16 clusters is reduced to 8 clusters. For example, (a) leaf clusters 12, 13, 14 of cluster hierarchy 210 are merged together with parent internal cluster 5 to form leaf cluster 5 of cluster hierarchy 510; (b) leaf clusters 6 and 7 of cluster hierarchy 210 are merged together to produce leaf cluster 6 of cluster hierarchy 510 (however, new leaf cluster 5 is not merged with clusters 6 and 7 because cluster 5 is incoherent with clusters 6 and 7); (c) leaf clusters 15, 16 of cluster hierarchy 210 are merged together with parent internal cluster 8 to form leaf cluster 8 of cluster hierarchy 510; and (d) leaf clusters 10, 11 of cluster hierarchy 210 are merged together with parent internal cluster 4 to form leaf cluster 4 of cluster hierarchy 510. Generally, CLiP processes a cluster hierarchy from the bottom up, attempting to merge clusters at the same level with these clusters' common parent (cross-level merging). In this manner, a parent cluster can become a leaf cluster only if all its children get merged. For example, only if clusters 5, 6 and 7 are merged will cluster 2 become a leaf node in the cluster hierarchy. Thus, cluster 6 (child) is not merged with cluster 2 (parent) because there are other children clusters of cluster 2 (cluster 5) that are not merged.

CLiP traverses a cluster tree in a Depth First Search (DFS) manner and merges clusters based on "cluster support" which is described in greater detail herein. DFS is any search algorithm for searching a tree structure or graph, which considers outgoing edges of a node before considering any neighbors of the node. Stated otherwise, a DFS algorithm systematically traverses branches completely before moving to another branch, rather than moving from one branch to another branch before the first branch is completely traversed. The children of a node in a cluster hierarchy can be in multiple scenario states, with a unique traversal methodology employed for each scenario, as follows:

Scenario: All leaves.

Methodology: If the children of a node consist of all leaves, consider clustering this node by merging of all its children or some of its children. This can result in the current node becoming a leaf if all its children are merged.

Scenario: All non-leaves.

Methodology: If all the children of a node are non-leaves, traverse the children (if not already done) to consider clustering of these non-leaves.

Scenario: Mix of leaves and non-leaves.

Methodology: If the non-leaves are not yet traversed, traverse them first. If the non-leaves are already traversed and resulted in no merging, then consider all the leaf clusters under this node for clustering.

Two main techniques form the core of the CLiP techniques: (a) a ε-Approximate Nearest Neighborhood (ANN) graph to determine the cluster support between two clusters; and (b) evaluation of the intra-cluster and inter-cluster compactness.

(A) ε-Approximate Nearest Neighborhood

ANN is similar to k-Nearest Neighborhood (kNN), except that with ANN the radius of influence for each point is defined instead of the number of neighbors. Generally, for each page in a sample of pages from at least two clusters being compared, the radius of influence is computed and which, if any, of the samples from the other clusters that fall within the radius is determined. Radius of influence for a page is defined as:

$R = d_0(1+\epsilon)$ where $d_0$ is the distance between the page and the page's nearest neighbor, and $\epsilon$ is a parameter which is very small and used to increase the radius of influence.

Because constructing an ANN graph for all the pages from all the leaf clusters is significantly resource intensive, according to one embodiment, a sample from each leaf cluster is considered based on the assumption of homogeneity of input clusters. Use of page sampling, rather than considering every page in the cluster, provides a more scalable solution. Because CLiP processing is based on a sample of pages from a given cluster of homogeneous pages, CLiP processing is of an order of the total number of input clusters in the worst case. Improved techniques for determining sampling size and/or which pages to sample are considered, but details of such techniques are beyond the scope of this description.

The following steps outline the procedure to construct an ANN graph for each page in the sample:

(1) Determine radius R defined above, by calculating $d_0$;
(2) Determine all the nearest neighbors within the radius R where the presence of an edge with a corresponding edge weight represents the closeness of the target page from the current page under consideration. According to one embodiment, the Euclidean distance between features (e.g., tag probabilities and tag sequence) of two pages is used as the edge weight between the two pages.

According to one embodiment, the Euclidean distance between two pages is computed based on tag probabilities and tag sequence. Tag probability is defined as the frequency of a particular tag in a particular page, i.e., the number of instances of the particular tag in the page divided by the total number of tags in the page under consideration [Probability (Tag)=number of instances (Tag)/total number of tags in the page]. Tag sequence represents the sequence, or position, of the instances of the particular tag within the page. According to one embodiment, the page tags are converted to corresponding numbers, where the numeric sequence for the page tags is used to represent the tag sequence within that page. According to one embodiment, a Fourier-based transform is performed on the numeric sequence of the page to compute tag sequence features for that page, and a subset of these tag sequence features is used in conjunction with the corresponding tag probabilities for that page to compute the n-space vector or point for that page. For example, for a page containing 100 different tags, and considering only the first 10 components of the Fourier transform on the tag sequence, results in 110 features representing that page (i.e., 100 tag probabilities and 10 tag sequences). Therefore, the Euclidean distance between the n-space point for each of the pages under consideration, i.e., the distance between the page and the page's nearest neighbor, is used to compute the radius of influence of the page as defined herein.

Based on the assumption of input cluster homogeneity, the following lemmas express the notion of similarity between two clusters in an intuitive way:

Lemma 1: The more the number of edges between two clusters $C_i$ and $C_j$, the more connected the clusters are.

Lemma 2: Using Euclidean distance to compute the edge weight between two pages, relatively less weight means the pages are relatively close. Hence, the more the sum of edge weights of all pages between $C_i$ and $C_j$, the farther apart are the clusters.

Based on the above two lemmas, Support S between two clusters $C_i$ and $C_j$ is defined as:

$$S(C_i, C_j) = \frac{N}{\sum_{P_k \in C_i, P_l \in C_j} EdgeWeights(P_k, P_l) + \sum_{P_k \in C_j, P_l \in C_i} EdgeWeights(P_k, P_l)}$$

Where N is the total number of edges between clusters $C_i$ and $C_j$ and $P_k$ and $P_l$ represent pages k and l. Thus, the "support" between two clusters represents the relative structural closeness of pages in $C_i$ and pages in $C_j$, based on pages from each cluster that are within the radius of influence of another. Consequently, the computed support values identify clusters that are candidates for merging with each other.

(B) Intra- and Inter-Cluster Compactness

Higher support between two clusters means higher probability that these two clusters will be merged. Hence, according to one embodiment, the computed support values between two clusters are sorted in descending order, and the "compactness" (i.e., opposite of the "spread") of the individual clusters (intra-cluster compactness) and the "compactness" of the combined cluster after merging (inter-cluster compactness) are computed as follows. Compactness of cluster $C_k$ is defined as:

$$CP(C_k) = \sum_{P_i \in C_k} \sum_{P_j \in C_k} \|P_i - P_j\|^2$$

where $P_i$ and $P_j$ represent pages from cluster $C_k$.

After computing intra-cluster and inter-cluster compactness, the following checks are performed:

(1) If the spreads within each of the two clusters (intra-cluster compactness) being considered for merging differ by a large order, this means that one of the clusters is very cohesive while the other cluster is not. According to one embodiment, in such cases, the two clusters are not merged because the homogeneity of one cluster would be effectively diluted by merging that cluster with another less homogeneous cluster.

(2) If the spread of the combined cluster (inter-cluster compactness), which is formed by merging the two clusters, is significantly higher than the spreads of the two individual clusters, this means that the cluster that would be formed by merging the two clusters may not be homogenous. As a goal is not to generate false positives, these two clusters are not merged.

Upon a cluster-pair not passing either of the foregoing spread checks (1) and (2), the merging process terminates. That is, the merging process for other cluster-pairs, which occur after the current cluster-pair in the descending-ordered list of support values, are not considered for merging. This is because the better candidates for merging are considered before the worser candidates for merging, based on the corresponding ordered list of support values.

Method for Grouping Structurally Similar Pages Based on Page Features

Figure 6:
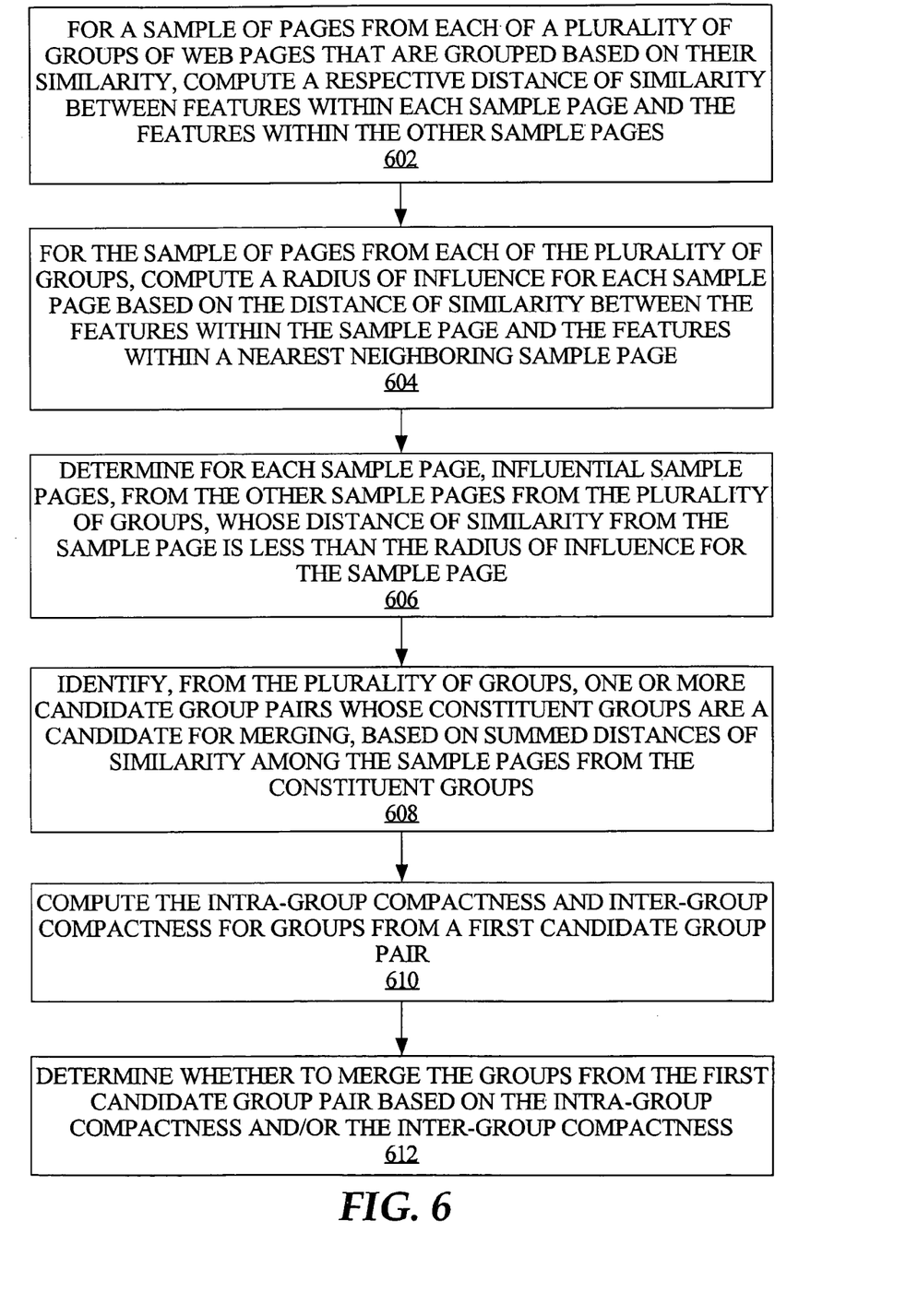
FIG. 6 is a flow diagram illustrating an automated process for grouping similar web pages based on page features, according to an embodiment of the invention.

FIG. 6 is a flow diagram illustrating an automated process for grouping similar web pages based on page features, according to an embodiment of the invention. In embodiments, the process illustrated in FIG. 6 is implemented for automated performance by a conventional computing system, such as computer system 700 of FIG. 7. Further, in embodiments, the process illustrated in FIG. 6 is implemented for automated performance within a software system architecture, such as that illustrated in FIG. 1. The process illustrated in FIG. 6 includes implementations of each of the CLiP techniques described herein: ε-Approximate Nearest Neighborhood, support between clusters, and intra- and inter-cluster compactness. However, each of these techniques can provide benefits independent of the other techniques and, therefore, can be implemented independent of the other techniques.

The process of FIG. 6 uses as input a plurality of groups of Web pages that were grouped together in respective groups based on the Web pages' structural similarity. According to one embodiment, the groups (i.e., clusters) input to the process of FIG. 6 are clusters output from the process of FIG. 3 or the process of FIG. 4, i.e., clusters output from a CURL technique based on analysis of corresponding URLs.

At block 602, a respective distance of structural similarity is computed for a sample of pages from each of the plurality of groups, where the distances are based on the similarity between features within each sample page and the features within the other sample pages. Hence, the distance of structural similarity between each pair of sample pages, across multiple input clusters, is computed at block 602. According to one embodiment, the distance of structural similarity is computed as described elsewhere herein, based on the Euclidean distance between point representations of respective pages. According to one embodiment, the distance of structural similarity is computed as described elsewhere herein, based on the Euclidean distance between point representations of the respective pages, where the point representations are n-dimensional points based on the tag probabilities and tag sequence within the respective pages. Computing the distance of structural similarity between each pair of sample pages is performed in an efficient manner without computing all pair-wise distances between all sample pages. For example, according to embodiments, the distance of structural similarity is computed using kd-tree technique or BD-tree (box-decomposition tree) technique.

Once the distances of structural similarity (e.g., do) are computed, the radius of influence is computed for each sample page, at block 604. Stated otherwise, for the sample pages from each of the plurality of groups, a radius of influence for each sample page is computed based on the distance of structural similarity between the features within the sample page and the features within a nearest neighbor sample page, where the nearest neighbor sample page is the page that is at the minimum distance of structural similarity from the sample page. According to one embodiment, the radius of influence is computed as described elsewhere herein, based on the Euclidean distance between point representations of the sample and nearest neighbor pages and on a parameter (e.g., ε) which is very small and which is used to increase the radius of influence beyond the nearest neighbor. According to one embodiment, the radius of influence is computed as described elsewhere herein, based in part on the Euclidean distance between point representations of the sample and nearest neighbor pages, where the point representations are n-dimensional points based on the tag probabilities and tag sequence within the respective pages.

Once the radius of influence is computed for each sample page from the plurality of groups, pages within the respective radii of influence are computed for each respective sample page, at block 606. Stated otherwise, zero or more influential sample pages are computed for each sample page, where an influential sample page is a page (from the other sample pages from the plurality of groups of Web pages) whose distance of structural similarity from the sample page is within (e.g., (i) less than or (ii) less than or equal to) the radius of influence for the sample page.

At block 608, one or more candidate group pairs are identified from the plurality of groups, where candidate group pairs are those pairs of groups that are candidates for merging. Candidate group pairs are identified based on the summed distances of structural similarity among sample pages from the constituent groups. According to one embodiment, the candidate group pairs are identified as described elsewhere herein, based on the amount of "support" between two groups, where support is computed based on the sum of (a) number of pages from second group which are within the radii of influence of the sample pages from the first group, and (b) number of pages from first group which are within the radii of influence of the sample pages from the second group (i.e., the numerator in the equation for $S(C_i\ C_j)$), and sum of (c) a first summed distances of structural similarity between the sample pages from a first group of a group pair and the influential sample pages from a second group of the group pair, and (d) a second summed distances of structural similarity between the sample pages from the second group of the group pair and the influential sample pages from the first group of the group pair (i.e., the denominator in the equation for $S(C_i\ C_j)$). According to one embodiment, the candidate group pairs are identified as described elsewhere herein, based on the equation for Support between two clusters $C_i$ and $C_j$, depicted as $S(C_i\ C_j)$.

At block 610, according to one embodiment, the inter-cluster compactness is computed for each group from a first candidate group pair, and the intra-cluster compactness is computed for the two groups from the first candidate group pair. According to one embodiment, the inter- and intra-cluster compactness values are computed as described elsewhere herein, based on the equation for Compactness of cluster $C_k$, depicted as $CP(C_k)$. Intra-cluster compactness for a given cluster $C_k$ is computed based on the equation for $CP(C_k)$, whereas inter-cluster compactness of a combined cluster after merging candidate clusters, referred to as $C_{k\_merged}$, is based on $CP(C_{k\_merged})$, where the equation is a function of the combined cluster. Whether or not both the intra-cluster compactness and the inter-cluster compactness are computed may vary from implementation to implementation. Thus, an implementation could compute only one of the intra- and inter-cluster compactness.

At block 612, whether or not to merge the constituent groups from the first candidate group pair is determined based on the intra-cluster compactness and/or the inter-cluster compactness. According to one embodiment and as described elsewhere herein, if either the intra- or inter-cluster compactness values for a candidate group pair does do not pass a corresponding test, then the pair groups are not merged. For example, if the intra-cluster compactness values for the two respective groups differs significantly (the difference being a tunable implementation detail), then the two groups are not merged. For example, if the inter-cluster compactness value for the potentially merged candidate groups is less than the compactness value of either or both the individual intra-cluster compactness values for the candidate groups, then the two groups are not merged.

According to one embodiment, blocks 610-612 are repeated for each of the candidate group pairs identified at block 608, unless and until one of the candidate group pairs does not pass one or both of the compactness tests, at which point the clustering process terminates for the particular domain under consideration.

Hardware Overview

Figure 7:
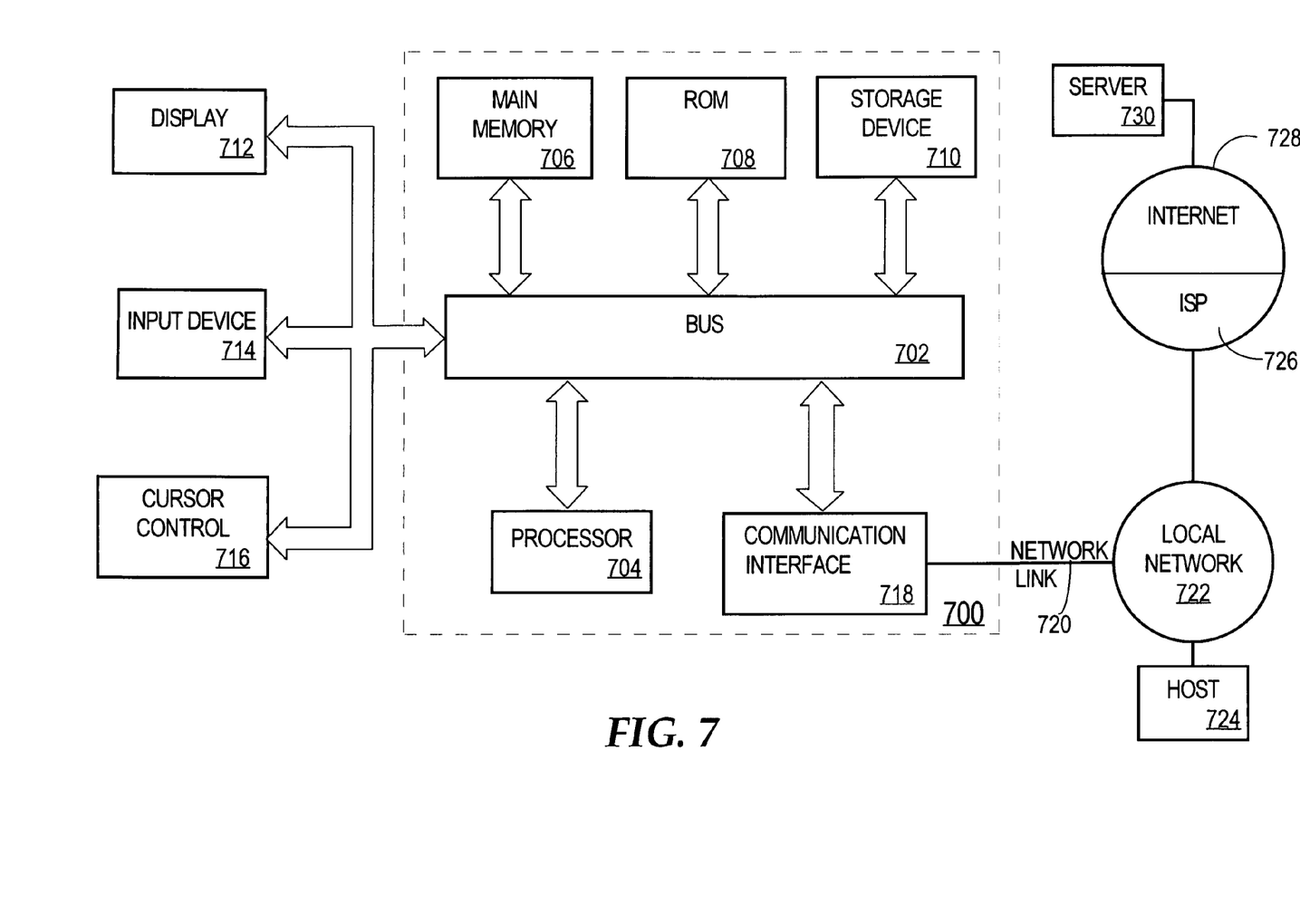
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correaction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for grouping structurally similar pages, comprising:
   normalizing each Uniform Resource Locator (URL) associated with each web page in a set of Web pages, wherein the step of normalizing each URL includes, for each URL:
      dividing the URL into a plurality of tokens to produce a sequence of the plurality of tokens;
      assigning each token of said plurality of tokens to a level based, at least in part, on the position of the token in the sequence of the plurality of tokens;
   computing level-specific variations by, for each level of a plurality of levels, comparing the tokens that are assigned to the level only to other tokens that have been assigned to the same level to compute a level-specific variation for the level;
   wherein the level-specific variations indicate a measurement of URL affinity at the levels;
   forming a plurality of groups of said Web pages based, at least in part, on said variations;
   wherein the variation for a corresponding level is computed based, at least in part, on the number of distinct values of the tokens at the corresponding level relative to the total number of tokens at the corresponding level;
   wherein the method is performed by one or more computing devices.

2. The method of claim 1, further comprising:
   reducing the number of said plurality of groups of Web pages by aggregating one or more of said groups, wherein the aggregation is performed based on tags in said Web pages, wherein the Web pages are Web pages in said one or more groups.

3. The method of claim 1, wherein the set of Web pages consists of Web pages from a certain domain.

4. The method of claim 3, wherein the certain domain is a certain website.

5. A computer-implemented method for grouping structurally similar pages, comprising:
   normalizing each Uniform Resource Locator (URL) associated with each Web page in a set of Web pages, resulting in normalized URLs,
   wherein the step of normalizing each URL includes, for each URL:
      dividing the URL into a plurality of tokens to produce a sequence of the plurality of tokens;
      assigning each token of said plurality of tokens to a level based, at least in part, on the position of the token in the sequence of the plurality of tokens;
   wherein each normalized URL uniquely identifies the tokens of said corresponding URL at each level of said corresponding URL;
   computing level-specific variations, wherein said variation for a corresponding level is computed based on the number of distinct tokens, at said corresponding level, in the URLs that correspond to said corresponding level relative to the total number of URLs associated with said set of Web pages;
   forming a plurality of groups of said Web pages based, at least in part, on said respective variations, wherein each group of said plurality of groups includes URLs that correspond to a particular corresponding level; and
   reducing the number of said plurality of groups of Web pages by aggregating one or more of said groups based on features of said Web pages in said one or more groups;
   wherein the method is performed by one or more computing devices.

6. The method of claim 5, wherein the set of Web pages consists of Web pages from a certain domain.

7. The method of claim 6, wherein the certain domain is a certain website.

8. A computer-implemented method for grouping structurally similar pages, comprising:
   determining a number of levels represented by each Uniform Resource Locator (URL) associated with each Web page in a set of Web pages;
   normalizing each URL associated with each Web page in said set of Web pages by representing each URL as a set of token values, wherein each set of token values contains a token value for each determined level of the corresponding URL and uniquely identifies the portion of the corresponding URL at each determined level of the corresponding URL;
   computing level-specific variations by, for each level of a plurality of levels, comparing the tokens that are assigned to the level only to other tokens that have been assigned to the same level to compute a level-specific variation for the level;
   wherein the level-specific variations indicate a measurement of URL affinity at the levels;
   wherein the variation for a corresponding level is computed based, at least in part, on a ratio of (a) the number of distinct token values, at the corresponding level, in the normalized URLs that correspond to the corresponding level and (b) the total number of URLs associated with said set of Web pages; and
   forming a first group of Web pages by grouping Web pages associated with said URLs at the level having minimum variation;
   wherein the method is performed by one or more computing devices.

9. The method of claim 8, further comprising:
   (a) comparing a next higher variation with a variation threshold;
   (b) if said next higher variation exceeds said variation threshold, then forming a next group of Web pages by grouping Web pages associated with URLs at the level having said next higher variation; and repeating steps (a) and (b) until there are no more levels for which said next group of Web pages can be grouped or there are no more levels whose corresponding variation exceeds said variation threshold.

10. The method of claim 9, further comprising:
reducing the number of said groups of Web pages by aggregating one or more of said groups based on features of said Web pages in said one or more groups.

11. The method of claim 10, wherein said features on which said aggregating is based comprise (a) the number of occurrences of respective tags in said Web pages in said one or more groups and (b) the sequence of said respective tags in said Web pages in said one or more groups.

12. The method of claim 9, further comprising:
inputting at least a subset of said groups of Web pages to a wrapper induction process that generates a respective extraction template corresponding to each group in said subset of said groups of Web pages, wherein said extraction templates are used for extracting information from said corresponding groups of Web pages.

13. The method of claim 12, further comprising:
classifying each of said groups of Web pages based on said distinct keywords in the URLs at the corresponding levels; and
eliminating a particular group of Web pages from inclusion in said subset based on said step of classifying.

14. The method of claim 9, wherein said variation threshold is based on said total number of URLs associated with said set of Web pages.

15. The method of claim 9, wherein said variation threshold is associated with a particular level, and wherein said variation threshold is based on said total number of URLs associated with said set of Web pages and on said particular level.

16. The method of claim 8, wherein determining a number of levels is based on static delimiters between levels represented within a URL, and wherein said static delimiters consist of the symbols "/", "?", and "&".

17. The method of claim 8, wherein determining a number of levels is based on learned delimiters between levels represented within a URL, and wherein said learned delimiters consist of non-alphabetic, non-numeric characters.

18. The method of claim 8, wherein determining a number of levels is based on unit change delimiters between levels represented within a URL, and wherein said unit change delimiters are characterized by a change from one type of unit to another type of unit wherein said types of units include letters, numbers, or symbols.

19. The method of claim 18, further comprising:
determining whether a particular unit change represents a change in levels in URLs in which the particular unit change is present, by
computing support for said particular unit change, wherein said support is based on a ratio of the number of URLs in which the particular unit change is present and said total number of URLs associated with said set of Web pages.

20. The method of claim 18, further comprising:
determining whether a particular learned delimiter represents a change in levels in URLs in which the particular learned delimiter is present, by
computing support for said particular learned delimiter, wherein said support is based on a ratio of the number of URLs in which the particular learned delimiter is present and said total number of URLs associated with said set of Web pages.

21. A computer-readable storage medium storing instructions for grouping structurally similar pages, which instructions, when executed by one or more processors, cause the one of more processors to perform the steps of:
normalizing each Uniform Resource Locator (URL) associated with each web page in a set of Web pages, wherein the step of normalizing each URL includes, for each URL:
dividing the URL into a plurality of tokens to produce a sequence of the plurality of tokens;
assigning each token of said plurality of tokens to a level based, at least in part, on the position of the token in the sequence of the plurality of tokens;
computing level-specific variations by, for each level of a plurality of levels, comparing the tokens that are assigned to the level only to other tokens that have been assigned to the same level to compute a level-specific variation for the level;
wherein the level-specific variations indicate a measurement of URL affinity at the levels;
forming a plurality of groups of said Web pages based, at least in part, on said variations;
wherein the variation for a corresponding level is computed based, at least in part, on the number of distinct values of the tokens at the corresponding level relative to the total number of tokens at the corresponding level.

22. The computer-readable storage medium of claim 21, further comprising instructions for:
reducing the number of said plurality of groups of Web pages by aggregating one or more of said groups, wherein the aggregation is performed based on tags in said Web pages, wherein the Web pages are Web pages in said one or more groups.

23. The computer-readable storage medium of claim 21, wherein the set of Web pages consists of Web pages from a certain domain.

24. The computer-readable storage medium of claim 23, wherein the certain domain is a certain website.

25. A computer-readable storage medium storing instructions for grouping structurally similar pages, which instructions, when executed by one or more processors, cause the one of more processors to perform the steps of:
normalizing each Uniform Resource Locator (URL) associated with each Web page in a set of Web pages, resulting in normalized URLs,
wherein the step of normalizing each URL includes, for each URL:
dividing the URL into a plurality of tokens to produce a sequence of the plurality of tokens;
assigning each token of said plurality of tokens to a level based, at least in part, on the position of the token in the sequence of the plurality of tokens;
wherein each normalized URL uniquely identifies the tokens of said corresponding URL at each level of said corresponding URL;
computing level-specific variations, wherein said variation for a corresponding level is computed based on the number of distinct tokens, at said corresponding level, in the URLs that correspond to said corresponding level relative to the total number of URLs associated with said set of Web pages;
forming a plurality of groups of said Web pages based, at least in part, on said respective variations, wherein each group of said plurality of groups includes URLs that correspond to a particular corresponding level; and reducing the number of said plurality of groups of Web pages by aggregating one or more of said groups based on features of said Web pages in said one or more groups.

26. The computer-readable storage medium of claim 25, wherein the set of Web pages consists of Web pages from a certain domain.

27. The computer-readable storage medium of claim 26, wherein the certain domain is a certain website.

28. A computer-readable storage medium storing instructions for grouping structurally similar pages, which instructions, when executed by one or more processors, cause the one of more processors to perform the steps of:

determining a number of levels represented by each Uniform Resource Locator (URL) associated with each Web page in a set of Web pages;

normalizing each URL associated with each Web page in said set of Web pages by representing each URL as a set of token values, wherein each set of token values contains a token value for each determined level of the corresponding URL and uniquely identifies the portion of the corresponding URL at each determined level of the corresponding URL;

computing level-specific variations by, for each level of a plurality of levels, comparing the tokens that are assigned to the level only to other tokens that have been assigned to the same level to compute a level-specific variation for the level;

wherein the level-specific variations indicate a measurement of URL affinity at the levels;

wherein the variation for a corresponding level is computed based, at least in part, on a ratio of (a) the number of distinct token values, at the corresponding level, in the normalized URLs that correspond to the corresponding level and (b) the total number of URLs associated with said set of Web pages; and forming a first group of Web pages by grouping Web pages associated with said URLs at the level having minimum variation.

29. The computer-readable storage medium of claim 28, further comprising instructions for:

(a) comparing a next higher variation with a variation threshold;

(b) if said next higher variation exceeds said variation threshold, then forming a next group of Web pages by grouping Web pages associated with URLs at the level having said next higher variation; and repeating steps (a) and (b) until there are no more levels for which said next group of Web pages can be grouped or there are no more levels whose corresponding variation exceeds said variation threshold.

30. The computer-readable storage medium of claim 29, further comprising instructions for:

reducing the number of said groups of Web pages by aggregating one or more of said groups based on features of said Web pages in said one or more groups.

31. The computer-readable storage medium of claim 30, wherein said features on which said aggregating is based comprise (a) the number of occurrences of respective tags in said Web pages in said one or more groups and (b) the sequence of said respective tags in said Web pages in said one or more groups.

32. The computer-readable storage medium of claim 29, further comprising instructions for:

inputting at least a subset of said groups of Web pages to a wrapper induction process that generates a respective extraction template corresponding to each group in said subset of said groups of Web pages, wherein said extraction templates are used for extracting information from said corresponding groups of Web pages.

33. The computer-readable storage medium of claim 32, further comprising instructions for:

classifying each of said groups of Web pages based on said distinct keywords in the URLs at the corresponding levels; and eliminating a particular group of Web pages from inclusion in said subset based on said step of classifying.

34. The computer-readable storage medium of claim 29, wherein said variation threshold is based on said total number of URLs associated with said set of Web pages.

35. The computer-readable storage medium of claim 29, wherein said variation threshold is associated with a particular level, and wherein said variation threshold is based on said total number of URLs associated with said set of Web pages and on said particular level.

36. The computer-readable storage medium of claim 28, wherein determining a number of levels is based on static delimiters between levels represented within a URL, and wherein said static delimiters consist of the symbols "/", "?", and "&".

37. The computer-readable storage medium of claim 28, wherein determining a number of levels is based on learned delimiters between levels represented within a URL, and wherein said learned delimiters consist of non-alphabetic, non-numeric characters.

38. The computer-readable storage medium of claim 28, wherein determining a number of levels is based on unit change delimiters between levels represented within a URL, and wherein said unit change delimiters are characterized by a change from one type of unit to another type of unit wherein said types of units include letters, numbers, or symbols.

39. The computer-readable storage medium of claim 38, further comprising instructions for:

determining whether a particular unit change represents a change in levels in URLs in which the particular unit change is present, by computing support for said particular unit change, wherein said support is based on a ratio of the number of URLs in which the particular unit change is present and said total number of URLs associated with said set of Web pages.

40. The computer-readable storage medium of claim 38, further comprising instructions for:

determining whether a particular learned delimiter represents a change in levels in URLs in which the particular learned delimiter is present, by computing support for said particular learned delimiter, wherein said support is based on a ratio of the number of URLs in which the particular learned delimiter is present and said total number of URLs associated with said set of Web pages.

* * * * *